W. MELAS.
GAGE.
APPLICATION FILED OCT. 30, 1914.

1,216,831.

Patented Feb. 20, 1917.
4 SHEETS—SHEET 4.

WITNESSES
H. G. Dieterich
P. F. Nagle

INVENTOR
William Melas
BY Wiedersheim & Fairbanks
ATTORNEYS

UNITED STATES PATENT OFFICE.

WILLIAM MELAS, OF RIDLEY PARK, PENNSYLVANIA, ASSIGNOR, BY DIRECT AND MESNE ASSIGNMENTS, TO DAVID TOWNSEND, OF PHILADELPHIA, PENNSYLVANIA.

GAGE.

1,216,831.  Specification of Letters Patent.  Patented Feb. 20, 1917.

Application filed October 30, 1914. Serial No. 869,369.

*To all whom it may concern:*

Be it known that I, WILLIAM MELAS, a citizen of the United States, residing at Ridley Park, county of Delaware, State of Pennsylvania, have invented a new and useful Gage, of which the following is a specification.

My invention relates to a new and useful improvement in gages more particularly for measuring pressures, vacuums and pressure differences and consists in providing a double balanced float, with means for adjusting the center of gravity of the float in two directions.

It further consists of means to control the float immersion from the exterior of the gage.

It further consists of means for closing the liquid from access to the float chamber.

It further consists of means for adjusting the gage reading.

It further consists of other novel features of construction, all as will be hereinafter fully set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts in the figures.

Referring to the drawings:—

Figure 1:
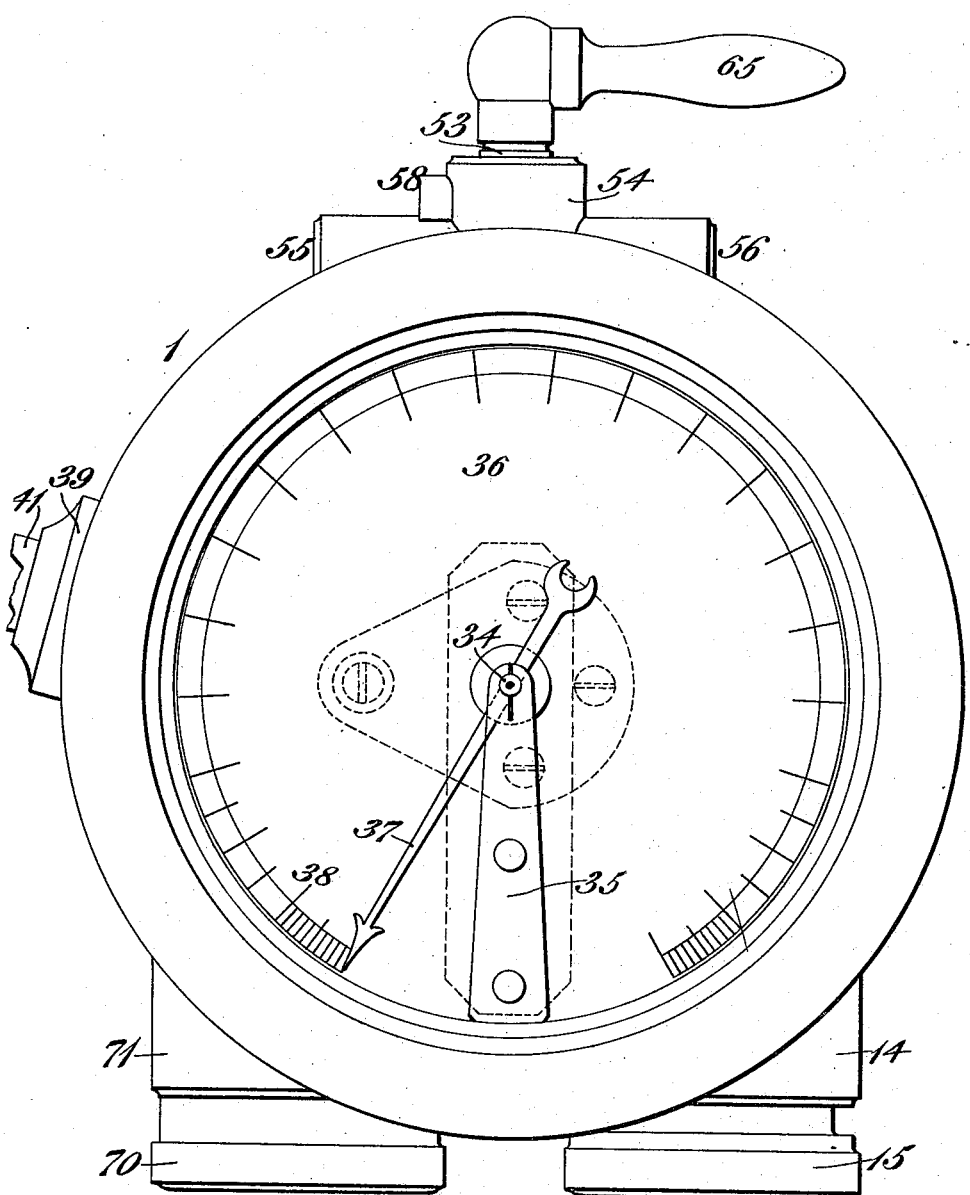
Figure 1 is a front elevation of a gage embodying my invention with a portion thereof broken away.

1 designates a casing of any suitable form, which is provided with suitable interior walls or partitions 2 and 3, forming a storage or pressure chamber 4, which is in communication by means of the passage 5 with the compensating gage chamber 6, and said walls also forming the chamber 7, in which is located certain portions of the operating mechanism. As here shown, 8 designates a tubular sleeve which is in threaded engagement, at 9, with a suitable portion of the wall 2, and the upper portion 10 of which sleeve is formed with a conical head adapted to bear against the conical seat 11 formed at a suitable point on the wall 2, in order that there will be a suitable tight joint or seat formed between these parts to prevent leakage. It will be seen that the said tubular sleeve 8 extends a suitable distance into the compensating gage chamber 6 and forms the float chamber 12 of the gage, which through the opening in the top thereof is normally in communication with the chamber 7. The upper portion of the chamber is reduced to form a seat 13, serving as the float seat and with which the float abuts at the proper time.

It will be understood that by causing the float 21 to seat and thus close the top of the float chamber, that the fluid when it rises in this float chamber is prevented from escaping, but should there, for any reason, be a leakage, it will be noted that the walls 2 are suitably inclined around the opening, in order that the fluid will flow back into the float chamber when the float is lowered again.

Around the opening in the wall of the casing, I provide an interiorly threaded boss 14, in which is adapted to be screwed, and so adjustably mounted, the sleeve 15, which carries a feather or key 16, movable in a slot 17 formed in the walls of a plug or adjuster 18, which suitably fits the opening and so forms the bottom of the chamber 6 and between which plug 18 and end of the sleeve 15, is the packing 19. Movably mounted within said sleeve 15 is a tightening screw 20, which is in threaded engagement with a suitable portion of the plug 18, in order that by the rotation of the said screw 20, the said plug can be moved with respect to said sleeve 15, in order to adjust the pressure upon the packing and insure a tight joint thereby. It will be seen that the upper surface of said plug forms the bottom of the compensating gage chamber 6, and by reason of its connection with the sleeve 15, the said plug is adjustable vertically, in order to vary the size of said chamber 6 and thus adjust the height of the fluid therein, as will be explained.

21 designates the float, which, as here shown, is in the form of a ball in order to properly seat upon the float seat 13. The float is carried by the float arm 22, which extends through the opening in the upper portion of the float chamber 12 and is fastened upon a shaft 23 suitably supported, it being noted that this portion of the mechanism is located in the chamber 7. In the present instance, the shaft 23 has its bearings in the screws 24 Fig. 4 adjustably mounted in the bosses or abutments 25 and 26 formed on or carried by the casing 1.

27 designates a counterweight which is mounted to travel or be adjusted in a direction at right angles to an imaginary line between the pivotal point of the float arm 22 and the center of the float 21, and, in the present instance, I have shown the counterweight in threaded engagement with a suitable portion of the float arm. I provide this adjusting device with respect to the float 21, and its adjuncts, in order that the center of gravity thereof can be brought into the said imaginary line, in order that the center of gravity will exert equal influences below and above the said horizontal line, which insures an even and equal balance in every position of the float. By this adjustment, the center of gravity can be positively and accurately located.

28 designates a second counterweight, which is movable in a plane leading from the pivotal point of the float arm and the center of the float, and by this means, I provide for moving or adjusting the center of gravity along the said imaginary line. This is of advantage, for the reason that by the employment of different liquids, or for other reasons, the float might otherwise be immersed too far or too little in the fluid employed. By this means the center of gravity of the system may be moved toward or away from the pivotal shaft or point, in order to properly adjust the float in its relation to the liquid, and to insure that it is immersed the proper amount of its volume.

In the present instance, I have mounted the float immersion counterweight 28 upon the threaded arm 29 carried on the shaft 23.

Figure 2:
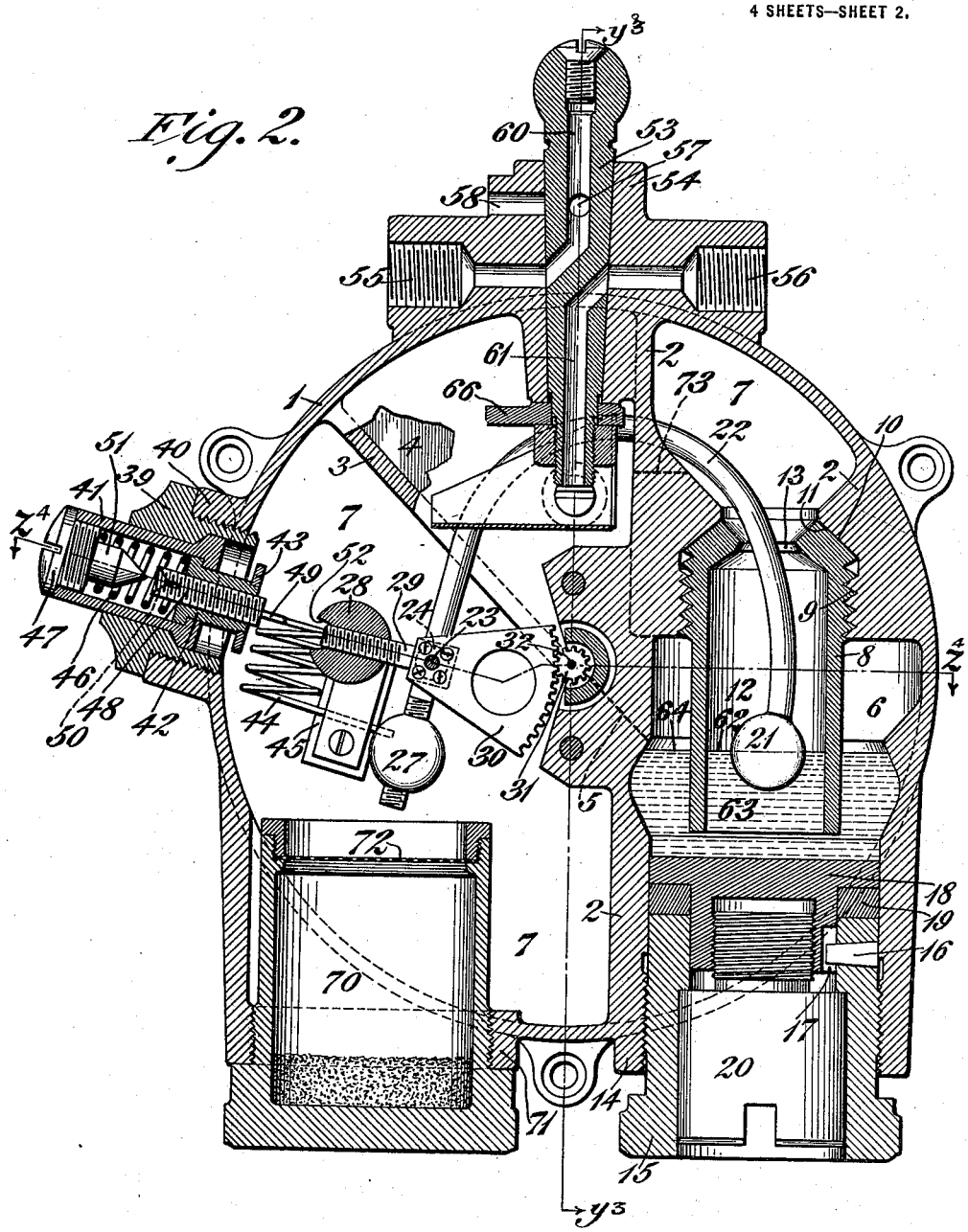
Fig. 2 is a sectional view on line $x^2$—$x^2$ Fig. 3.
Figure 4:
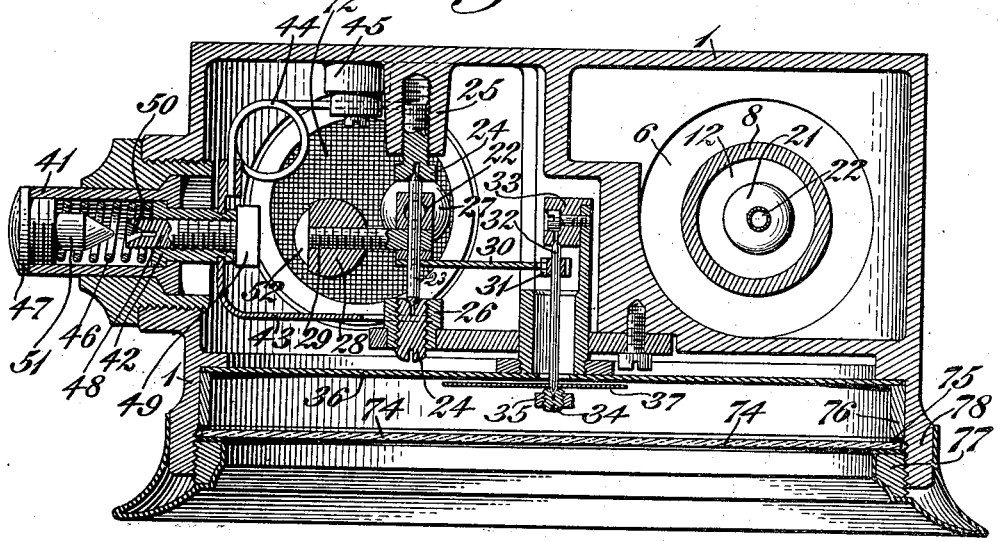
Fig. 4 is a sectional view on line $z^4$—$z^4$, Fig. 2.

Also mounted and carried on the shaft 23 is a segment 30, Figs. 2 and 4, the teeth of which are adapted to engage with a pinion 31, which is carried by the pointer shaft 32, one end of which is journaled in a block 33, the other end of which is journaled in a bearing 34 carried by a link 35, suitably supported exterior of the dial face 36, said shaft 32 carrying the hand or pointer 37, the end of which is mounted in suitable movable relation with respect to the graduations 38 on the dial.

In order to adjust the counterweight 28 from the exterior or without removing the parts and without injuring the delicate apparatus, I have provided means which are positive and exact, and which cannot impart any jar to the parts to injure the same.

To accomplish this result, I have provided a gland 39 in threaded engagement with a boss 40 around an opening in the casing 1 and movably mounted in said gland is a sleeve 41, a suitable portion of which forms a tight joint or seat with the gland to prevent leakage and to act as a valve. Guided in the sleeve and in movable relation thereto is a nut 42, which is in suitable connection with or is engaged by a stop 43 Fig. 4, here shown as an arm, one side of which is in suitable connection with an end of a spring 44, here shown as a coil spring, and the other end of the spring 44 is in suitable connection with a suitable stationary point such as the boss 45 carried by the casing. The opposite end of the stop or arm 43 is bifurcated or slotted a suitable distance, which end straddles the abutment 26, in order that the movement of said stop 43 is limited by said abutment 26. From the above, it will be seen that while the nut is permitted longitudinal movement with respect to the sleeve 41, rotary movement of the nut is prevented.

46 designates a spring carried within the sleeve 41, one end of which bears against the nut 42 and the opposite end of which bears against the sleeve cap 47, in the present instance, so that the said nut will be held in extended position under normal conditions, it being understood that this second spring is of greater strength or intensity than the said spring 44. In threaded engagement with the nut is a screw member 48 carrying upon its inner end a blade 49, and the other end of which screw is provided with a countersink 50. Carried by the sleeve cap 47 is a conical pin 51 adapted at the proper time to enter the countersink 50 in the screw member 48.

52 designates a slot or cut-away portion in the counterweight 28 adapted at the proper time to receive the blade 49.

The operation of these parts provides means for adjusting the counterweight 28 without injury to any of the parts and is accomplished by pushing upon the sleeve cap 47, thus pushing in the sleeve 41, and as the coiled spring 44 is weaker than the spring 46, the relation of the sleeve 41 with respect to the nut 42 is maintained, the said spring 44 giving away and allowing the whole combination of sleeve 41, nut 42 and screw member 48 to move inwardly or longitudinally until the stop 43 strikes the abutment 26, whereupon the inward movement of said nut, and screw member, including the blade 49, has reached its limit. In this position, the said blade 49 is then situated in the slot 52 of the counterweight 28 in such a manner that the forward edge of the blade does not touch the bottom of the slot 52, so that there is no pressure placed upon the shaft nor is there any blow imparted thereto. By the continued inward pressure on the sleeve 41, the tension of the spring 46 is overcome and the sleeve 41 moved inwardly, on the nut 42, until the conical pin 51 enters the countersink in the screw member 48, and by the proper rotation of the pin 51 and sleeve 41, the frictional engagement of the pin 51 with the screw member 48 will rotate the latter and the blade 49 will impart the proper rotation to the counterweight 28, varying the position of the same on its shaft or threaded arm 29, and will thus adjust or vary the position of the center of gravity along the imaginary line between a pivotal point of the float arm 22 and the center of the float 21.

Upon releasing the pressure on the sleeve 41, the spring 46 within the same being stronger, will at once remove the conical end 51 from its engagement with the screw 48. By the further releasing of the pressure upon the parts, the spring 44 will then act to throw back the parts to their proper and normal position.

It will be understood that by reason of the normal rotation of the screw member or blade 49, the screw member 48 with the blade thereon will always move out in the same direction as that in which the slot in the counterweight is situated, in order that upon the next inward movement of the said blade, the parts will always be in proper position for reëngagement.

The number of threads per inch of the screw which carries the blade, and the number of threads per inch of the stem which carries the counterweight are the same, so that the relative position of the forward edge of the blade and the bottom of the slot of the counterweight is always maintained for any position of the counterweight.

Figure 3:
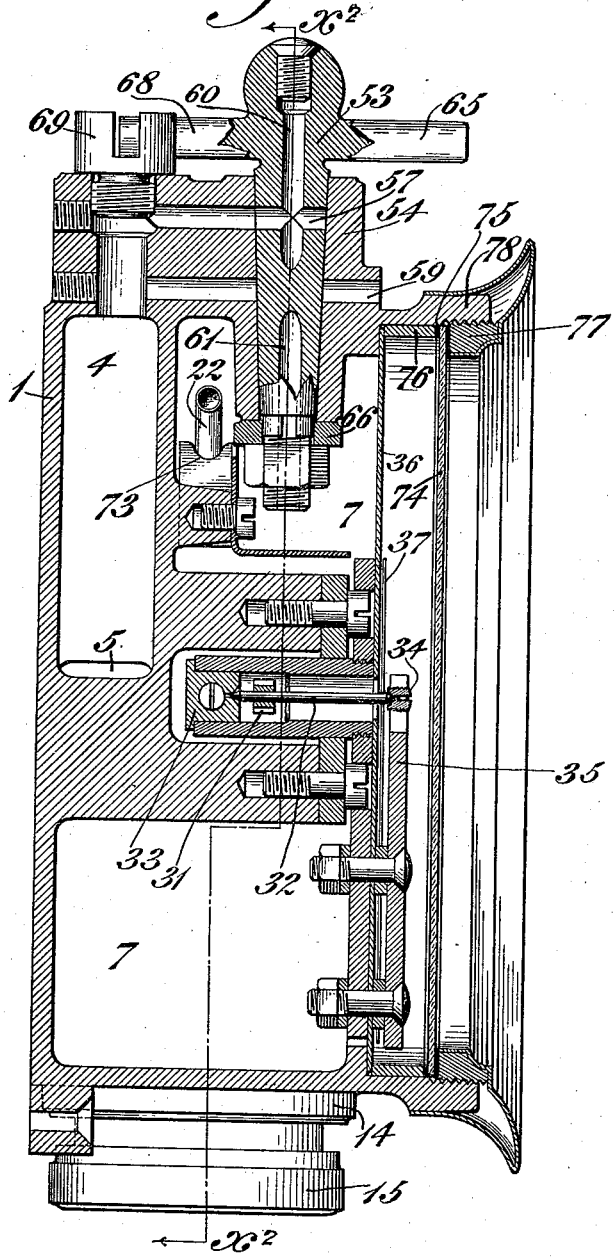
Fig. 3 is a sectional view on line $y^3$—$y^3$ Fig. 2.

53 designates a cock mounted in a suitable opening in a boss 54 carried by the casing 1, in which latter is provided the high pressure intake 55 and the low pressure intake 56, and also the high pressure cross bore 57 and the high pressure release bore 58, and a low pressure release bore 59, Fig. 3, it being understood that the cock 53 is provided with a high-pressure bore 60 and a low pressure bore 61.

When the parts are in the position seen in Figs. 2 and 3, the bore 61 is in communication with the low pressure intake 56 and also with the chamber 7, whereby it is in communication with the float chamber 12 and so with the outer level 62 of the fluid 63, while the bore 60 of the cock is in communication with the high pressure intake 55 and also with the high pressure cross bore 57, being thus in communication with the storage or pressure chamber 4, and thus by reason of the opening 5 is in communication with the compensating gage chamber 6 and so with the inner level 64 of the liquid. In this position, the cock is in the position seen in Fig. 5, and it will be understood that both pressures are on. The bores are so arranged with respect to the communicating parts and each other that they operate simultaneously to prevent a sudden inrush of pressure on one side which will be apt to injure the mechanism by causing a too violent motion thereof.

By moving the handle 65 of the cock, 90° from its position seen, the bore 61 will move to connect with the bore 59, and the bore 60 will be placed in communication with the bore 58, so that both pressures will be exhausted and atmospheric pressure will be on the inner and outer liquid level, and the water level in the compensating chamber and in the float chamber will be in the same horizontal plane, and the float being in its lowest position, the gage will indicate zero.

I have provided a stop or lock 66, Fig. 2, on the cock so situated that by further turning of the handle 65, the said stop will be located above the float arm, locking the same in position.

Figure 5:
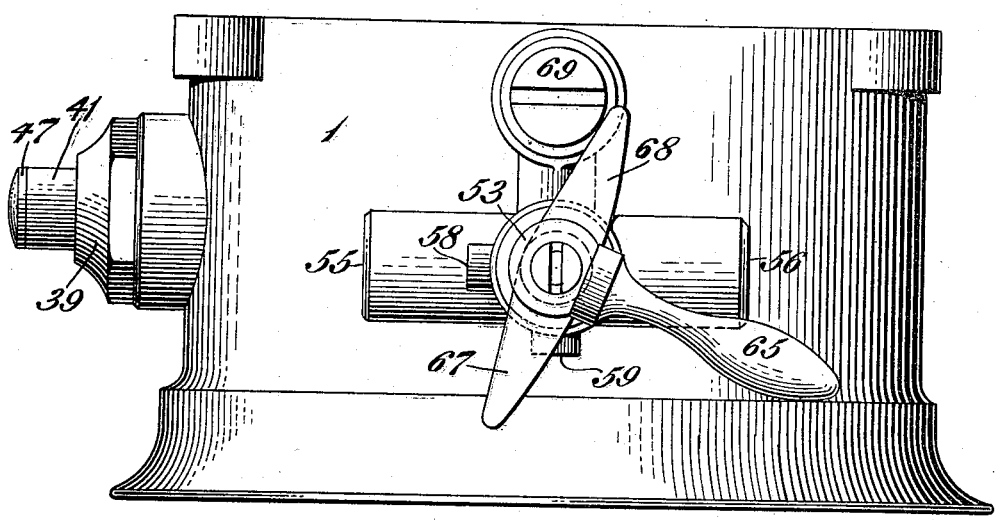
Fig. 5 is a top plan view thereof.

67 and 68 Fig. 5 are stop wings adapted to contact with an abutment, in order to limit the movement of the cock 53, and, as here shown, I have employed the head 69 of a filling plug for this purpose, it being noted that by removing the filling plug 69, the fluid can be inserted into the storage or pressure chamber 4.

70 designates a cup or receptacle which is situated within an opening in the wall of the casing, and as here shown, is in threaded engagement with a boss 71 around the opening, said cup or receptacle being adapted to contain a moisture absorbent substance, which moisture might arise from any cause whatever in the interior of the casing or gage. 72 designates a screen suitably connected with or carried by the cup 70, which while permitting passage of the moisture in order to reach the substance, will prevent the latter from escaping from the receptacle.

73, Fig. 3 designates the seat or stop formed at a suitable point on the wall 2 and upon which it will be understood that the float arm 22 is adapted to rest when in its lowermost position, and in order that the stop or lock 66 may be turned to a position above said float arm to lock the same in this position. It will be understood that the front of the gage is provided with a glass 74, the connection of which is formed air-tight, and here shown as between the glass and the dial plate 75 is a spacing member 76, a suitable packing being interposed between the glass and the spacing member. The glass 74 is held in place by a ring 77, between which and the glass is a suitable packing, and as here shown the said ring 77 is in threaded engagement with a threaded boss 78.

The operation of the device is as follows:—By removing the filling plug 69, the fluid may be inserted into the storage or pressure chamber 4. If it is desired to transport the gage, the plug 18 may be first screwed up until it is in engagement with the lower wall of the float chamber, so that the fluid cannot enter the same. In this manner the fluid is confined within the pressure chamber 4 and the gage chamber 6, and can have no effect upon the mechanism. It will be understood that if the gage has already been in operation and it is desired to transport the gage, then the fluid which has been situated in the gage chamber and the float chamber, during which time the plug 18 has been spaced from the lower wall of the float chamber, as, for example, as seen in Fig. 2, by placing the gage upon its back, the fluid can all be caused to run into the pressure chamber 4 and then by screwing up the plug 18, the float chamber can be closed, as above described.

When the parts are in the position seen in Fig. 2 it will be understood that the device is in operative condition, and in turning the cock 53 into the position seen in Fig. 2, it will be understood that the low and high pressures are simultaneously admitted so as to prevent the sudden inrush of pressure and in such a manner that the lower pressure will be directed upon the outer level of the fluid within the float chamber, while the higher pressure will be directed upon the inner level 64 of the fluid within the gage chamber 6. The difference between the pressures is measured by the movement of the float, which will be indicated on the dial.

As the movement of the float is in an arc, by reason of its pivotal connection, the divisions on the dial for equal change of pressure would not be equal if there was not some compensation provided. That is to say, in order to get equal division on the dial for equal increments of pressure, the float motion has to be compensated, and as here shown, I have provided for this compensation in the gage chamber by the deviations from the cylindrical shape thereof, which deviations can be determined and depend upon the distance of the float from the center of movement and also in the angles to which the float moves.

It will be understood that while I have shown the compensating surface as provided in the walls of the gage chamber, the compensating feature need not necessarily be located there, as it could be provided at any point where it will accomplish the result in the structure in which the fluid is normally maintained.

The hand or pointer of the gage should be on zero if the pressures on the inner and outer level of the liquid are alike. A change or deviation from the position can arise from two causes,—first, by a change of the normal liquid level in the gage chamber due to the evaporation or loss of liquid, or due to excess of liquid, and, second, by a change of the immersion depth of the float due to a deposit of a film of the liquid on the float or float arm as the liquid may evaporate and condense partly on such float parts.

Both of these causes may also act together in such a way as to increase or decrease the total error or in such a manner that the errors will compensate each other and the gage will show zero. As for example the immersion of the float may be deeper than normal and the liquid level may be higher than normal by an amount sufficient to bring the hand or pointer to zero. The starting point of the reading would then be correct, but the other readings, except this one, would be wrong, because the liquid level is not at the proper relative height on the gage chamber.

In order to rectify the gage as to proper height of liquid level and as to proper depth of immersion it requires the following procedure:—

1. Gage reading is brought to zero by adjusting sleeve 15 and so the adjuster 18 which will raise or lower the center of the float and the liquid level simultaneously.

2. Pressure is then applied to the pressure chamber (or suction to the low pressure chamber) and the dial reading noted.

The adjuster 18 is then moved out slowly and thereby the liquid level lowered until the gage hand or pointer begins to waver which will indicate that the liquid level is just at the lower surface of the float chamber, the wavering being caused by irregular motions of the float due to the escape of air through the liquid column in the float chamber. When this occurs, the adjuster or plug 18 must be screwed back as many turns as the dial reading showed tenths of an inch in case water is the fluid employed. This operation adjusts the liquid level to the normal position. The pressure is then released, and if thereafter the hand or pointer does not show zero, it will be understood that the float immersion needs correction, which can be accomplished by means of the counterweights 27 and 28, as already described.

From the above it will be understood that by reason of the adjustment of the plug, the fluid level can always be accurately adjusted and allowed for, due to any change in the amount of fluid for any reason, while the adjustment of the counterweight 28 can adjust the float immersion, and thus compensate for any increase in weight of the float by reason of condensation or other causes.

By these two adjustments, the gage can always be adjusted in order that the pointer will normally be situated at zero and the pressure on the inner and outer fluid levels is alike.

Having thus described my invention, what I claim as new and desire to secure by Letters Patent, is:—

1. In a device of the character stated, a casing formed with a gage chamber, a fluid therein, an open-ended sleeve carried by said casing and extending into the fluid to form a float chamber and to provide a pressure surface on the fluid in each chamber, a float suitably immersed in the fluid in said float chamber, means for adjusting the immersion of said float to provide a constant displacement thereof for any working position and for any given fluid means suitably controlled for admitting different pressures upon said fluid surfaces, means for indicating the position of said float, and means for adjusting the fluid level in said chambers.

2. In a device of the character stated, a casing formed with a gage chamber, a fluid therein, an open-ended sleeve carried by said casing and extending into the fluid to form a float chamber and to provide a pressure surface on the fluid in each chamber, a float suitably immersed in the fluid in said float chamber, means to vary the center of gravity of said float for adjusting the immersion of said float to provide a constant displacement thereof for any working position and for any given fluid, means for admitting different pressures upon said fluid surfaces, means for indicating the position of said float, and means for adjusting, from the exterior of the gage, the fluid level in said chambers.

3. In a device of the character stated, a casing formed with a gage chamber, a fluid therein, an open-ended sleeve carried by said casing and extending into the fluid to form a float chamber and to provide a pressure surface on the fluid in each chamber, a balanced float suitably immersed in said fluid, means for adjusting the center of gravity of the float system both vertically and laterally, means for admitting the different pressures upon said fluid surfaces, and means for indicating the position of said float.

4. In a device of the character stated, a casing formed with a gage chamber, a fluid therein, an open-ended sleeve carried by said casing and extending into the fluid to form a float chamber and to provide a pressure surface on the fluid in each chamber, a float in said float chamber, a seat formed at the upper portion of said float chamber and with which said float is adapted to contact in the proper position thereof to prevent improper escape of the fluid from the top of said float chamber, means for admitting different pressures upon said fluid surfaces, and means for indicating the position of said float.

5. In a device of the character stated, a casing formed with a gage chamber, a fluid therein, an open-ended sleeve carried by said casing and extending into the fluid to form a float chamber and to provide a pressure surface on the fluid in each chamber, a pivotally mounted float suitably immersed in the fluid in said float chamber, means for admitting the different pressures upon said fluid surfaces, means for indicating the position of said float, and means for compensating for the movement of the float in an arc to provide equal indicating divisions for equal increments of pressure.

6. In a device of the character stated, a casing formed with a gage chamber and a storage chamber provided with a communication therebetween, an open-ended sleeve carried by said casing and projecting into said gage chamber thus forming a float chamber, a float in said float chamber, a fluid in said gage chamber and said float chamber, an adjuster forming the bottom wall of said gage chamber, and means for moving said adjuster into contact with the lower wall of said sleeve to close the same to the fluid, when the latter has been directed into the storage chamber.

7. In a device of the character stated, a casing formed with a gage chamber adapted to receive a fluid, and a storage chamber having a suitable communication therewith and into which the fluid can be directed, when desired, an adjuster forming the bottom wall of the gage chamber, an open-ended sleeve carried by said casing and extending into the fluid to form a float chamber and to provide a pressure surface on the fluid in each chamber, a float in said float chamber controlled by the fluid therein and adapted to fall to its lowermost position when the fluid is directed into the storage chamber, means for moving said adjuster into contact with said sleeve to close the same to the fluid, and means for locking said float in its lowermost position.

8. In a device of the character stated, a casing formed with a gage chamber, a fluid therein, an open-ended sleeve carried by said casing and extending into the fluid to form a float chamber and to provide a pressure surface on the fluid in each chamber, a float suitably immersed in the fluid in said float chamber, means for simultaneously equalizing the pressure upon the inner and outer surfaces of the fluid and means for locking the said float in its lowermost position.

9. In a device of the character stated, a casing formed with a float-chamber, a lever fulcrumed in said casing and having a float on one arm and located in said float chamber, a screw-threaded arm projecting from the fulcrum point of the lever, a counterweight upon said arm and formed with a notch, and a member rotatable and slidable in the casing in axial alinement with the threaded arm and the notch in the counterweight and formed with a blade adapted to engage said notch to rotate said weight.

10. In a device of the character stated, a casing, a float-lever fulcrumed in said casing and having a screw-threaded arm projecting from the fulcrum point of the lever, a counter-weight upon said threaded arm and formed with a notch, a sleeve slidable and rotatable in the casing, a nut slidable in the inner end of said sleeve, a stop upon said nut, an abutment adapted to be engaged by such stop, a spring bearing against the inner end of said nut, a screw axially threaded in the nut and having a blade at its inner end adapted to engage the notch of the counter-weight, a screw-plug in the outer end of the sleeve and formed with a pin at its inner end adapted to engage the outer end of the screw, and a spring within the sleeve and confined between the outer end of the nut and said plug.

11. In a device of the character stated, a casing formed with a gage chamber adapted to receive a fluid and with a float chamber having its open lower end immersed in the fluid in said gage-chamber and having an inlet opening in its top formed with a downwardly facing annular seat, and a float-lever movable in said opening and provided with a float and adapted to fit against and close said seat.

12. In a device of the character stated, a casing formed with a float chamber, a lever fulcrumed in said casing and having a float on one arm and located in said float chamber, an arm projecting from the fulcrum point of the lever, a counterweight adjustably carried by said arm and having an engaging means, and a member rotatable and slidable in the casing in suitable alinement with the arm and the counterweight and having engaging means adapted to coact with the engaging means of the weight to rotate it.

13. In a device of the character stated, a casing, a float-lever fulcrumed in said casing and having an arm projecting from the fulcrum point of the lever, a counterweight adjustable upon the arm and formed with engaging means, a sleeve slidable and rotatable in the casing, a nut slidable in the inner end of said sleeve, a stop upon said nut, an abutment adapted to be engaged by such stop, a spring bearing against the inner end of said nut, a screw axially threaded in the nut and having engaging means adapted to engage the engaging means of the counterweight, a movable plug in the sleeve and formed with means adapted to engage the screw, and a spring within the sleeve and confined between the outer end of the nut and said plug.

14. In a device of the character stated, a casing formed with a gage chamber, a fluid therein, an open-ended sleeve carried by said casing and extending into the fluid to form a float chamber and to provide a pressure surface on the fluid in each chamber, a float suitably immersed in the fluid in said float chamber, means for adjusting the immersion of said float to provide a constant displacement thereof for any working position and for any given fluid, means indicating the position of said float, and means for adjusting the fluid level in said chambers.

15. In a device of the character stated, a casing formed with a gage chamber adapted to receive a fluid, a float chamber having its open lower end immersed in the fluid in said gage chamber and having an inlet opening in its top formed with a seat, a float lever pivotally supported and having an arm movable in said opening, and a float carried by said lever and movable in said float chamber and adapted to fit against and close said seat.

16. In a device of the character stated, a casing formed with a gage chamber, a fluid therein, an open-ended sleeve carried by said casing and extending into the fluid to form a float chamber and to provide a pressure surface on the fluid in each chamber, a pivoted float suitably immersed in the fluid in the float chamber and mounted to move in the arc of a circle therein, means for indicating the position of the float, and means for admitting different pressures upon the inner and outer surfaces of the fluid.

17. In a device of the character stated, a casing formed with a gage chamber, a fluid therein, an open-ended sleeve carried by said casing and extending into the fluid to form a float chamber and to provide a pressure surface on the fluid in each chamber, a float suitably immersed in the fluid in the float chamber, a stationarily supported pivot, a rigid arm carried by the pivot and supporting the float, whereby the latter moves in an arc of a circle in the float chamber, means for indicating the position of the float, and means for admitting different pressures upon the inner and outer surfaces of the fluid.

18. In a device of the character stated, a casing formed with a gage chamber, a fluid therein, an open-ended sleeve carried by said casing and extending into the fluid to form a float chamber and to provide a pressure surface on the fluid in each chamber, a pivotally mounted float immersed in the fluid in the float chamber for movement in an arc of a circle therein, means movable at right angles to the plane through the axis of rotation and the center of the float for bringing the center of gravity of the float system into said plane, means movable in a line within said plane for adjusting the said center of gravity with respect to the axis of rotation, means for indicating the position of the float, and means for admitting different pressures upon the inner and outer surfaces of the fluid.

19. In a device of the character stated, a casing formed with a gage chamber and a float chamber, a fluid therein having a pressure surface in each chamber, a pivotally mounted float immersed in the fluid in the float chamber, means movable at an angle to the plane through the axis of rotation and the center of the float for bringing the center of gravity of the float system into said plane, means movable in a line within said plane for adjusting said center of gravity with respect to the axis of rotation, means for subjecting the inner and outer surfaces of the fluid to different pressures, and means to indicate the position of the float.

WILLIAM MELAS.

Witnesses:
C. D. McVay,
M. E. Byrne.

Copies of this patent may be obtained for five cents each, by addressing the "Commissioner of Patents, Washington, D. C."